Aug. 26, 1952   B. W. BADENOCH   2,608,365
AIRCRAFT CONTROL SURFACE

Filed April 8, 1946                           2 SHEETS—SHEET 1

INVENTOR.
BENJAMIN W. BADENOCH
BY Edwin Coates
ATTORNEY

Aug. 26, 1952     B. W. BADENOCH     2,608,365

AIRCRAFT CONTROL SURFACE

Filed April 8, 1946                                                2 SHEETS—SHEET 2

INVENTOR.
BENJAMIN W. BADENOCH
BY J Edwin Coates
ATTORNEY

Patented Aug. 26, 1952

2,608,365

UNITED STATES PATENT OFFICE 2,608,365

AIRCRAFT CONTROL SURFACE

Benjamin W. Badenoch, Los Angeles, Calif., assignor to Douglas Aircraft Company, Inc., Santa Monica, Calif.

Application April 8, 1946, Serial No. 660,443

5 Claims. (Cl. 244—87)

This invention relates to aircraft control surfaces, and particularly to those which affect the direction and attitude of flight. It thus primarily concerns rudders and elevators, but, as will become apparent hereinafter, it is also applicable to ailerons and other surfaces deflectable to alter the attitude of the craft.

In order to bring extremely large control moments into action for executing certain maneuvers, or to meet certain emergency situations, conventional control surfaces are designed with areas considerably larger than are necessary for normal flight control and stability. For example, the area of a conventional elevator-stabilizer unit must be somewhat greater than that required for normal stability or for climbing and gliding, in order to enable a reasonable upward deflection thereof, on landing, to provide a moment sufficient to force down the rearward landing gear component first. For, if the conventional elevator of normal area is deflected much beyond 20°, the airstream separates therefrom, stalling of the control surface inevitably ensuing. In airplanes incorporating landing flaps—and most modern airplanes do—this excessive area must be still further augmented, to avoid the excessive, stall-producing, elevator deflections otherwise necessary to overcome the negative, tail-raising pitching moments induced by lowered landing flaps when the craft is quite near the ground.

Again, the area of a conventional rudder-fin unit also must be appreciably greater than that requisite for normal-flight directional control and stability, in order to provide sufficient control and stability on those occasions when the speed of the craft is diminished below a certain value, as by reduction of the propulsive power upon failure of the engine, or of one of the engines. For, if a normal sized rudder were employed, to provide control at these low speeds it would have to be deflected to such a large angle that separation of the airstream therefrom and stalling thereof would invariably occur.

It is desirable that control surfaces remain in aerodynamic balance at all angular deflections thereof. Conventional control surfaces, however, at extremely high deflection angles exhibit a tendency to undergo airstream separation in the aerodynamically balancing portions thereof. Consequently, the effectiveness of these portions may diminish at exceptionally high angular deflections, so that the control surface may not remain in perfect aerodynamic balance under all conditions.

The present invention obviates these and other disadvantages pertaining to control surfaces and provides a balanced, substantially unstallable control surface which will have an area less than that of the conventional control surface of comparable effectiveness while having a maximum angle of effective deflection considerably greater than the comparable conventional control surface. To achieve this end, the surface is so constructed that extremely large angular deflections thereof may be achieved without the occurrence of airstream separation from any portion of the control surface, whereby it remains non-stallable and aerodynamically balanced at any angle to which it may be deflected.

Although of the minimum area, the present control surface is employable wherever creation of high control moments and achievement of maximum control and stability would ordinarily necessitate the incorporation of a greater area in the control-and-stabilizing unit than is desirable for normal flight control and stability. Thereby, not only is the craft rendered less "stiff" as regards stability, but the pilot's operating forces are minimized and an appreciable amount of drag, weight and fabrication cost is eliminated.

As a typical example of the advantageous nature of the invention, it has been ascertained in service that elevators having noses aerodynamically balanced as in United States Patent No. 2,070,809 to L. E. Root and incorporating the present invention can be deflected at least 15° beyond the conventional 20° limit without stalling the control surface or diminishing the aerodynamic balance thereof. For other types of control surfaces, the invention effectuates an increase in the maximum angle of effective deflection of the surface by as much as 40% above that achievable by the conventional control surface that requires a much larger area. When incorporated in rudder designs aerodynamically balanced in the nose according to the aforesaid patent, the present invention effects a reduction in the area of the rudder and fin unit amounting, in some instances, to as much as 28½% below the area hitherto required therefor, while maintaining the control surface effective and balanced at unusually high deflections.

Briefly, these and other advanced results are attained by incorporating in the leading portion of the control surface profile, at least one boundary-layer energizing passageway lying entirely within the contour of the control surface itself. In the presently preferred embodiments, this channel extends from approximately the entering edge line of the control surface, for the full spanwise extent thereof, rearwardly towards the trailing portion of the control surface and substantially chordwise thereof. The channel is constructionally and aerodynamically adapted to function in such a manner as to segregate and conduct a portion of the airstream impinging upon the entering edge region, rearwardly therefrom to that face of the trailing portion of the deflected control surface which, because of excessive deflection, is at that time on the verge of entering the stall regime. The leading portion of the control surface is further so constructed and mounted that the entrance to the channel is shielded from the dynamic airstream during all normal flight regimes and is placed in communication with the airstream only when the deflection is sufficiently high to tend to cause separation of the airstream from the nose and from the face of the control surface.

In one of its constructional aspects, the invention contemplates the provision of the foregoing features by the employment of structural and aerodynamic means so combined with the leading portion of the control surface as to concurrently establish the novel airstream channel in the leading portion of the surface contour and entirely within the profile of the surface, while dually completing an oscillation suppressing nose having the properties described in the aforesaid Root patent.

The presently preferred constructional embodiments employ a constricted leading portion and an auxiliary aerodynamic member or airfoil mounted thereon and lying within the profile of the control surface. This member partakes of the nature of an airstream segregator or deflector so constructed as to have the contour, profile and section of a portion of the nose of the symmetrical, blunt and rounded, relatively short and enlarged balanced nose.

Preferably, the novel control surface is so mounted and supported that its nose normally lies in a well in the trailing portion of a fixed anterior surface such as a fin, stabilizer, or wing, so that the antistalling channel is shielded from the dynamic airstream until the control surface is deflected to that degree where the conventional surface begins to stall, at which juncture the entrance to the channel is communicated with the dynamic airstream. The ensuing flow of auxiliary additional air segregated from the airstream by the dual-function aerodynamic member and directed onto the energy-losing or stalling face of the trailing portion of the control surface, energizes the boundary layer thereon sufficiently to enable deflection of the surface to be continued far beyond the maximum limit for conventional control surfaces.

In the application of the invention to a horizontally disposed surface, such as an elevator, aileron or flap, the leading portion of the surface is asymmetrically constricted in the direction of its minimum dimension in such a manner as to provide a lower surface lying well within the profile of the final control surface contour and one of the present novel aerodynamic members is mounted downwardly and forwardly on this portion in such spatial relationship thereto, as to define therewith, by means of its inner surface, the novel boundary layer energizing passageway while concurrently completing, by means of its exterior surface, a symmetrical, blunt and rounded relatively short and enlarged oscillation-suppressing nose of the aforementioned patent. The so constructed elevator is mounted on the stabilizer with its nose disposed and shielded in a well in the trailing portion of the stabilizer, for the purposes described.

In the application of the invention to a vertical surface, such as a rudder, the leading portion of the control surface is also constricted in the direction of its minimum dimension, but symmetrically, and each of the two vertical sides of the constricted portion has one of the present novel aerodynamic members associated therewith, each such member concurrently establishing with the adjacent side of the rudder, one of the novel boundary layer energizing passageways, its exterior surface being contoured and located to form a portion of the contour of a symmetrical, blunt and rounded, relatively short and enlarged balanced nose, the passageways and the auxiliary aerodynamic members lying entirely within the basic profile or contour of the rudder.

Several of the presently preferred embodiments of the invention are, by way of example only, illustrated in the accompanying drawings and described hereinafter in conjunction therewith. It is to be understood, however, that the invention can assume many other constructional forms, being limited in the embodiments in which it can vest, only by the scope of the sub-joined claims.

Figure 1:
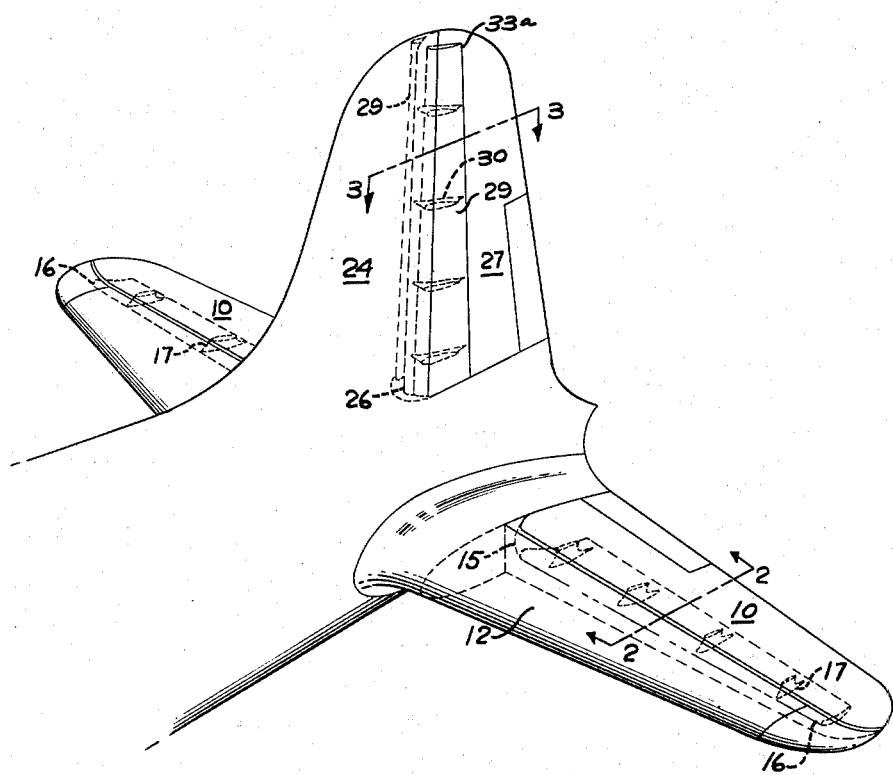
Figure 1 is a fragmentary perspective of the empennage of an airplane embodying the invention in its rudder and elevators.
Figure 2:
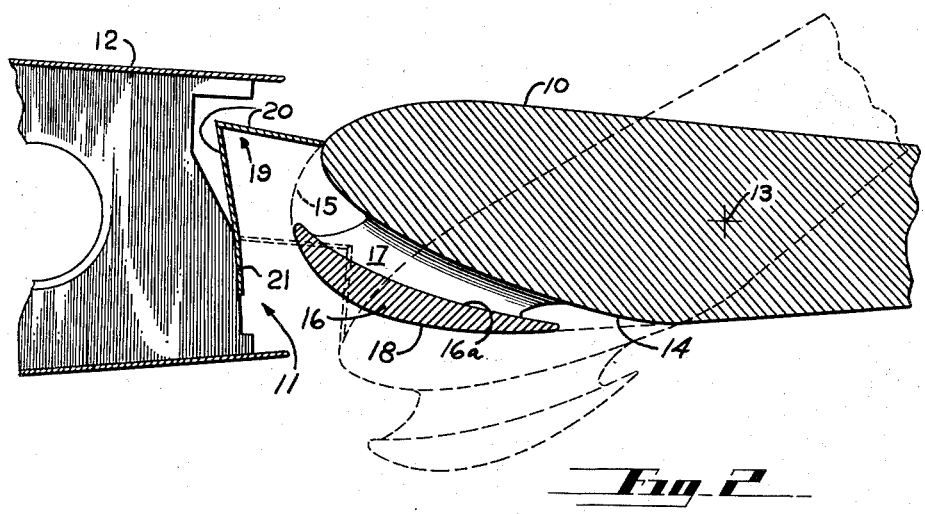
Figure 2 is a diagrammatic, fragmentary, chordwise section of a stabilizer and elevator, showing the control surface in neutral in solid lines, and in tail lowering attitude in dotted lines.

The invention is shown in Figures 1 and 2 as incorporated in an elevator 10, the nose of which is associated with or disposed in, a well 11 in the trailing edge of a horizontal stabilizer 12. The elevator is pivotally mounted in the usual manner about a hinge axis indicated at 13, for upward and downward deflection. Conventional elevator operating means, not shown, are provided.

The lower surface of the leading portion of the elevator, beginning at a point lying at, somewhat rearwardly of, or slightly forwardly of, a vertical line passing through the hinge axis, according as the thickness of the elevator varies with the design, is constricted towards the upper surface. That is, the leading portion is asymmetrically contoured in cross-section, or in the direction of the minimum dimension of the elevator. In other words, the lower surface of the elevator, for a distance greater than the length of the leading portion, equal to said length, or slightly less than said length, as the case may be, lies closer to the median, fore-and-aft or longitudinal line of the elevator than does the upper surface, and has a greater camber than the upper surface. The upper surface of the elevator lies such a mean camber distance above the median line, from a point rearward of the hinge line to the entering edge of the elevator, as to constitute, when combined with means hereinafter described, a greater or lesser portion of an aerodynamically balanced nose for preventing oscillation of the elevator, such nose being disclosed in United States Patent No. 2,070,809 to L. E. Root. The camber of the lower surface may be varied to suit various design requirements and the radius of curvature of the entering edge of the airfoil may be concomitantly varied in accordance therewith, to provide leading portions of various cross-sectional contours. The length and radius of curvature of the curve of the lower surface of the leading portion may be varied to suit varying conditions and requisites, as will be made manifest hereinafter. In all cases, however, it is desired that the entering edge of the resultant contour lie above the median longitudinal line of the airfoil, for reasons hereinafter explained.

Mounted on the lower surface of the leading portion of the elevator by means of streamlined connectors 15, is an auxiliary airfoil 16 adapted to partake of the nature of a deflector-vane. This vane extends spanwise of the elevator and is spaced, in the longitudinal direction of the control surface, forwardly and somewhat downwardly from the lower surface 14, of the leading portion. The member 16 is usually so located as to dispose the entrance of the slot which it defines with the elevator in such a position as to include the median line of the elevator, as illustrated. In some instances, however, the entering edge of the vane may lie below the median line. In other instances, the entering edge of the deflector may lie above the median line, these positions varying according to the varying design characteristics of the elevator. In any event, the construction is such as to dispose the entrance to the channel within the well at all normal conditions of the control surface and to communicate the channel with the airstream only at such angular deflections of the control surface as would cause a conventional control surface to begin to stall.

The trailing edge of the vane preferably lies in the vicinity of the rearmost point of the contour of the leading portion of the elevator, and therefore in some instances lies closely adjacent a transverse line extending through the hinge axis, and in other instances lies an appreciable distance ahead of said line. In any event, the auxiliary airfoil and the passageway defined by it are so designed as to deflect the lower branch of the free airstream impinging upon the entering edge of the elevator inwardly and rearwardly against the lower surface 14 of the elevator when the passageway is exposed to the airstream, whereby to cause this segregated portion of the airstream to energize the boundary-layer on the lower surface of the elevator sufficiently to prevent separation of the airstream therefrom at substantially all angles of deflection of the elevator or whenever the passage communicates with the airstream.

The operating angle to which the elevator can effectively be deflected is thereby increased quite appreciably over the conventional such angle for the conventional control surface otherwise equivalent to the present as regards area and basal aerodynamic properties. For example, the elevator of a large transport plane incorporating the present invention can be deflected upwardly to −35° without stalling the surface, which fact greatly facilitates getting the airplane's tail down in landing.

It is to be observed that the auxiliary airfoil 16 aerodynamically cooperates with the body of the control surface in a dual manner while lying within its profile. The inner surface 16a of the airstream director 16 defines with the adjacent surface of the body, a boundary-layer energizing passageway 17, its outer surface 18 concurrently constituting at least a portion of a lower surface of the type of balanced, oscillation suppressing nose described in the aforementioned Root patent. That is to say, the external contour, or configuration, established in the leading edge region of the elevator by the particular construction, disposition, spacing and mounting of the member 16 provides the control surface with a symmetrical, relatively short and enlarged, but blunt and rounded nose portion. It is demonstrated in the aforementioned patent that such a nose suppresses oscillation or hunting of the control surface. This function of the nose is, by virtue of the combination therewith of the boundary-layer energizing channel concurrently established by the airfoil 16, maintained operative at substantially all angles of deflection of the control surface, inasmuch as the airstream is prevented from separating from the balanced nose at those large angular deflections where separation might tend to diminish its novel aerodynamic balancing effect.

It is preferable to construct the airfoil 16 solidly of wood or the like, instead of employing the usual hollow sheet metal construction. Among other advantageous results, such construction, because of the weight of the solid airfoil, enhances the static balance of the elevator. The cross-sectional contour of the solid airfoil can be made such as to eliminate possible aerodynamic disadvantages, whilst conferring strength upon the wooden airfoil. The fore-and-aft dimensions of the airfoil may be suitably varied to permit the elevator primary spar, not shown, to be located at any desired distance from the entering edge of the elevator, the auxiliary airfoil then being contoured suitably in cross-section to maintain the proper aerodynamic proportions of the entrance, the exit and the intermediate stations of the energizing-channel.

Passage of the lower branch of the airstream through the gap between the elevator and the stabilizer might tend to nullify the beneficial effects of the foregoing construction. It might also have a tendency to unbalance the elevator, by allowing aerodynamic imbalance to build up on opposite sides of the control surfaces, especially at high speeds, high angles of deflection, and at high aerodynamic angles of attack. When the design is such that these phenomena may occur, the gap between the rearmost vertical wall of the stabilizer and the leading edge of the elevator may be closed, for the full span of the elevator, as by pressure-seal means 19. The forward edge of the sealing means is then attached in the stabilizer well, preferably on or near the median line thereof, and the rearward edge of the sealing means is attached to the leading edge of the elevator, preferably above the entrance to the channel. However, the rearward edge of the sealing member may be attached directly to the entering edge of the auxiliary airfoil if it is desired to distrain and direct the upper airstream into the channel instead of the lower airstream.

A suitable form of sealing means is shown as consisting of a plurality of plates 20 pivotally joined edgewise to each other as shown. The forward end 21 thereof is anchored to the rearmost vertical wall of the well, the rearward end being anchored to the nose cap of the elevator. If desired, the seal may instead consist of an equivalent flexible impervious material such as a sized fabric, not shown, but similarly attached at its front end to the stabilizer well rearward wall and at its rear end to the elevator above the energizing channel. Again if desired, sealing means may optionally consist of the equivalent combination, not shown, of an arcuate rear wall in the well with a spring-biased bulbed extrusion-beam mounted in the entering edge of the control surface to extend spanwise thereof and forwardly into rubbing contact with said wall sufficiently to establish an airtight barrier between the upper and lower surfaces of the gap at all deflections of the control surface.

In all embodiments of the invention, the entrance to the channel is unexposed to the dynamic airstream at ordinary flight deflections of the elevator, that is, at deflections not above 20° or 21°, both negative. Preferably, the channel entrance only emerges into the airstream from the well at angles exceeding 20°. Since ordinary flying maneuvers never involve elevator deflections exceeding 20°, the present channel, therefore, is exposed to the liability of icing or obstruction by other foreign matter, only during the instant or so before touchdown occurs, at which juncture it is necessary to severely upwardly deflect the elevator. On "down-elevator," of course, the channel is protected from the airstream by the sealing member at all angles of deflection and hence of course prevents icing under such conditions.

It is to be understood that, although the incorporation of the pressure-seal entails certain advantageous results, its use is not mandatory and it may be dispensed with if desired, especially in low-speed craft.

Another advantageous feature of this construction and arrangement of the auxiliary airfoil and channel lies in the fact that both the energizing channel and the balanced-nose features can be incorporated without dispensing with the conventional "torque box" type of nose construction, not shown, but to be understood as present in the conventional framing of the elevator.

Figure 3:
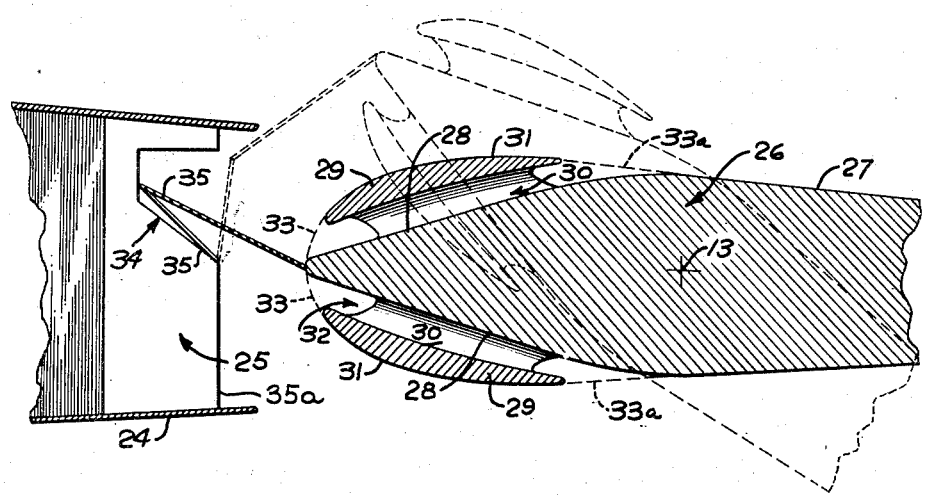
Figure 3 is a diagrammatic horizontal fragmentary section of a fin and rudder, showing the control surface in the neutral position in solid lines, and in deflected position in broken lines.

In Figure 3, the invention is shown incorporated as a rudder and fin unit comprising a fin 24 including a well 25 in its trailing edge portion with which is associated the leading portion 26 of a rudder 27. The leading portion of the rudder, from points lying at the extremity of a transverse line situated either closely adjacent its hinge axis or passing therethrough, to points lying closely adjacent the entering edge of the rudder, is constricted towards the median line in a symmetrical manner to form a somewhat pointed contour, as shown. Each of the opposite surfaces 28 of the leading portion is contoured laterally or horizontally throughout its full height for cooperation with an auxiliary airfoil 29 attached to the leading portion by means of streamlined connectors 30. Each of the airfoils partakes of the nature of an airstream segregator, deflector and director and is preferably constructed solidly of wood. Each has an exterior surface 31 contoured to form, in cooperation with the remainder of the exterior surface of the rudder, at least a portion of the exterior contour of a blunt, rounded, relatively short and enlarged, symmetrical balanced nose of the type described in the aforementioned Root patent. The inner surface of each auxiliary airfoil is contoured vertically and laterally to constitute, in cooperation with the adjacent surfaces 28 of the leading portion, an aerodynamic passageway 32 having an entrance 33 lying on the exterior contour of the balanced nose and slightly aft of the entering edge of the rudder. The exit 33a of the channel lies preferably near the transverse line through the hinge axis that intersects the exterior surfaces of the balanced nose.

The channel thus formed is adapted, when communicated with the airstream, to energize the boundary-layer on the aft portion of the rudder and prevent airstream separation therefrom at unusually high angles of deflection thereof. The auxiliary surfaces and channels, in cooperation with the leading portion of the rudder, establish a balanced nose, at the same time directing the airstream into such close conformity with the contour of the nose as to prevent airstream separation therefrom, whereby to maintain the balanced nose effective at substantially all angles of deflection thereof. The balanced nose thus remains effective to suppress oscillation of, or hunting by, the nose of the rudder substantially regardless of the maneuver being executed.

Preferably, the rudder's leading portion and the auxiliary airfoils are so designed that the entrances to the channels are shielded under normal circumstances and are exposed to the airstream only when the rudder has been deflected at least 21°. As hereinbefore explained in connection with the elevator, this feature among other things, prevents icing of the channels, or obstruction thereof by other foreign matter.

A seal 34, here shown as constructed of a plurality of plates 35 pivotally joined to each other at their inner edges, may, under the circumstances aforementioned, be vertically disposed in the gap between the entering edge of the rudder and the vertical wall 35a of the well for the full vertical extent of this gap. It may be attached at its forward edge to the vertical wall in the fin-well, and at its rearward edge, to the entering edge of the rudder. This sealing member then acts to prevent passage of the airstream from one side of the fin to the energizing channel on the opposite side of the rudder, so that in either direction of deflection of the rudder, only one channel receives the dynamic airstream. The other channel will, at this time, be shielded from the dynamic airstream by the seal member and is therefore exposed only to the relatively static air pressure existing in the well region. The boundary-layer lying on the then rearward surface of the rudder is hence energized at this time, preventing separation on both the novel balanced nose and on the side faces of the rudder, which remains effective substantially regardless of the angle of deflection, the balanced nose also performing its novel balancing functions at these unusual angles of deflection.

The operating hinge moments of control surfaces incorporating the invention undergo no radical changes until the control surface deflection passes ±20°, whereupon instead of the usual "peaking," or sudden rise in these moments occurring, same is suppressed, the hinge moments beyond ±20° deflection rising but linearly and only at the rate of rise that occurs below ±20° deflection. Below ±20° deflection, the invention allows the hinge moments to rise in the normal linear fashion, at the normal linear rate of rise.

In addition, appreciable structural economies are effected by the invention. For example, a rudder incorporating the present invention, while having its effectiveness increased on the order of 40%, concurrently permits a reduction of the order of 28½% in the vertical surface area of the fin and rudder unit. This improvement is effected without requiring any elevation at all of the minimum speed at which the aircraft can be controlled upon failure or diminution of the propulsive power. In this embodiment, as in the foregoing, the channel exposed to the dynamic airstream will be exposed thereto only for the few instants following failure of the power plant, that is, while corrective rudder is being applied, so that liability of the energizing conduits icing or otherwise becoming obstructed, is reduced to the minimum.

In all embodiments of the invention, it is to be understood that the specific form, contour, and arrangement of the leading portion of the control surface, of the auxiliary airfoils, and of the energizing conduits, are subject to change to suit the particular airplane or type of airplane in which they are employed.

Various refinements and developments of the particular constructions illustrated are contemplated by the invention, and it is to be understood that they all lie within the scope of the subjoined claims.

I claim:

1. An airplane controlling and stabilizing unit, comprising: an anterior stabilizing surface having a well in its trailing portion including a substantially vertical wall; a posterior control surface mounted adjacent said well, the body of which control surface has a transversely constricted nose portion terminating on the leading edge of the profile of said control surface, said constricted nose having a vertical surface extending rearwardly and divergently on each side face thereof from the leading edge of said control surface substantially to the region of the hinge axis thereof and shaped rearwardly and vertically of the control surface for aerodynamic cooperation with a nose-completing portion; and a nose-completing portion supported by said control surface laterally adjacent each of said vertical surfaces, the forward extremity of each of said nose-completing portions lying rearwardly adjacent the forward extremity of the body of the control surface and the rearward extremity thereof terminating adjacent the rearward edge of said side surface, the outer surface of each of said nose-completing portions forming a portion of the contour of an aerodynamically balanced nose, the inner surface of each of said portions defining with the adjacent face of the control surface a rearwardly directed airstream channel extending continuously in a straight line from the leading edge of the body of said control surface on the exterior contour of the control surface to the region of the hinge axis; and an aerodynamic pressure seal extending rearwardly from said vertical wall to a line along the forward extremity of the body portion of said control surface lying intermediate the entrance of said channels, so as to prevent, upon deflection of said control surface, entry of the airstream into that channel which lies opposite to the direction of deflection of the forward portion of the control surface, thereby to then render said oppositely-lying channel ineffective while rendering the remaining channel effective, whereby to energize said control surface and inhibit stalling thereof at unusual angles of deflection thereof while concurrently maintaining same aerodynamically balanced, with the hinging moments maintained substantially the same as those of a control surface of the same area and of channelless construction.

2. In an aircraft control system, the combination of: a forward, fixed, substantially horizontally extending airfoil having a well in its trailing edge region; a movable substantially horizontally extending airfoil pivotally mounted rearwardly of said fixed airfoil with its leading edge normally juxtaposed to said well and having a main body portion; the median line of said main body portion extending longitudinally forwardly and being concave toward the adjacent first outer side of said main body portion throughout the portion from the pivotal region forward; the forward portion of said first outer side being curved to form a part of the profile of a symmetrical, aerodynamically balancing leading portion movable into the opposite branches of the airstream; a deflector vane mounted in spaced relation to the second outer side of the forward portion of said main body portion and organized to define therewith an anti-stalling boundary-layer-energizing channel and concurrently formed and disposed on its outer side to complete the rest of the profile of said symmetrical aerodynamically balancing leading portion, the entrance to said channel lying substantially transversely of said airfoil and lying at least partially in the high positive pressure area of the forward contour of said airfoil thereby to enable entry thereinto of high energy, stall inhibiting airflow; and an aerodynamic pressure seal extending from the rearward wall of said well to the leading edge of said movable airfoil at the one side of the entrance of said channel to prevent passage of the airstream from the corresponding side of said fixed forward airfoil toward the opposite side thereof and into said channel, and to confine aerodynamic communication of said channel to the adjacent branch of the airstream only; whereby to concurrently aerodynamically balance said movable airfoil while preventing stalling thereof in all deflection positions thereof.

3. In an aircraft control system, the combination of: a forward, fixed, substantially vertically extending airfoil having a well in its trailing edge region; a movable substantially vertically extending airfoil pivotally mounted rearwardly of said fixed airfoil and having a leading portion normally juxtaposed to said well; said leading portion including a leading edge and vertical surfaces extending from said leading edge substantially to the hinge axis region thereof and each contoured longitudinally and laterally for aerodynamic cooperation with a nose-completing portion; a nose-completing portion supported by said control surface adjacent to each of said vertical surfaces and extending rearwardly from a location rearward of said leading edge; the exterior surface of each such portion forming at least a part of the profile of a symmetrical leading portion extending from said hinge axis region substantially to said leading edge and constituting an aerodynamically-balancing nose on said control surface; the interior surface of each such portion defining, with the adjacent one of said vertical surfaces, a boundary-layer energizing channel lying entirely within the exterior surfaces of such nose; and an aerodynamic pressure seal extending operatively from said well to said leading edge; whereby to maintain said control surface aerodynamically balanced and its boundary layer energized by airstream addition to the one side surface thereof at substantially all angular deflections thereof.

4. An aircraft control group, comprising: a stabilizer-airfoil having a trailing edge that includes a rearwardly facing wall; a control airfoil, including a main body and at least one airstream-channelizing vane, disposed rearwardly spacedly adjacent said stabilizer-airfoil so as to define with said wall an airstream gap extending transversely of said group; said control airfoil being pivotally mounted on the aircraft on a pivot axis located substantially midway between the surfaces of said airfoil so as to enable deflection of the leading portion of said control airfoil into the airstream at each side of said control group; the leading portion of the main body of said control airfoil being substantially abruptly constricted transversely thereof substantially from its pivotal mounting to its leading edge; said airstream-channelizing vane being mounted on the one side of said constricted portion in outwardly spaced substantial conformity thereto; the exterior surface of said vane lying on the contour line of the complete control airfoil and the interior surface of said vane defining with the adjacent surface of said constricted portion a control-airfoil boundary-layer energizing channel lying within said contour lines; the entrance to said channel lying at least partially in the high pressure region of said leading portion so as to enable entry thereinto of the high-energy airstream and the exit from said channel directing said airstream onto the rearward portion of said control airfoil; and an aerodynamic pressure seal extending connectedly from said wall across said gap to the leading edge region of the main body of said control airfoil so as to prevent passage of the airstream through said gap; thereby to obviate loss of aerodynamic pressure balance on said control airfoil and to positively constrain the airstream on the side of the control-airfoil towards which said leading portion is deflected to enter said channel; whereby to enable the employment of a control-airfoil having a lesser area for its maximum achievable control moment; and a greater maximum angle of deflection without stalling, than a conventional control-airfoil having the same maximum control moment.

5. An aircraft control group, comprising: a stabilizer-airfoil having a trailing edge that includes a rearwardly facing wall; a control airfoil, including a main body and at least one airstream-channelizing vane, disposed rearwardly spacedly adjacent said stabilizer-airfoil so as to define with said wall an airstream gap extending transversely of said group; said control airfoil being pivotally mounted on the aircraft on a pivot axis located substantially midway between the surfaces of said airfoil so as to enable deflection of the leading portion of said control airfoil into the airstream at each side of said control group; the complete contour of the leading portion of said control airfoil being symmetrically blunted and rounded and having a substantially abruptly bulbous cross-sectional shape so as to confer aerodynamic balance on said control-airfoil; the leading portion of the main body of said control airfoil being substantially abruptly constricted transversely thereof substantially from its pivotal mounting to its leading edge; said airstream-channelizing vane being mounted on the one side of said constricted portion in outwardly spaced substantial conformity thereto; the exterior surface of said vane lying on the contour line of the complete symmetrically blunted and rounded abruptly bulbous leading portion and the interior surface of said vane defining with the adjacent surface of said constricted portion a control-airfoil boundary layer energizing channel lying within said contour line; the entrance to said channel lying at least partially in the high pressure region of said leading portion so as to enable entry threinto of the high energy airstream and the exit therefrom directing said airstream onto the rearward portion of said control airfoil; and an aerodynamic pressure seal extending connectedly from said wall across said gap to the leading edge region of the main body of said control airfoil so as to prevent passage of airflow through said gap; thereby to obviate loss of aerodynamic pressure balance on said airfoil and to positively constrain the airstream on the side of the control airfoil towards which said leading portion is deflected to enter said channel; whereby to aerodynamically balance said control-airfoil while enabling employment of an airfoil having a lesser area for its maximum achievable control moment, and a greater maximum angle of deflection without stalling, than a conventional control airfoil having the same maximum control moment.

BENJAMIN W. BADENOCH.

REFERENCES CITED

The following references are of record in the file of this patent:

UNITED STATES PATENTS

| Number | Name | Date |
|---|---|---|
| 1,945,254 | Bittner | Jan. 30, 1934 |
| 2,070,809 | Root | Feb. 16, 1937 |
| 2,211,870 | Wagner | Aug. 20, 1940 |
| 2,281,696 | Johnson | May 5, 1942 |
| 2,403,770 | Van Zelm | July 9, 1946 |

FOREIGN PATENTS

| Number | Country | Date |
|---|---|---|
| 665,716 | Germany | Oct. 1, 1938 |